March 20, 1956
E. C. HORTON
2,738,535
WINDSHIELD WIPER ARM
Filed Feb. 23, 1952
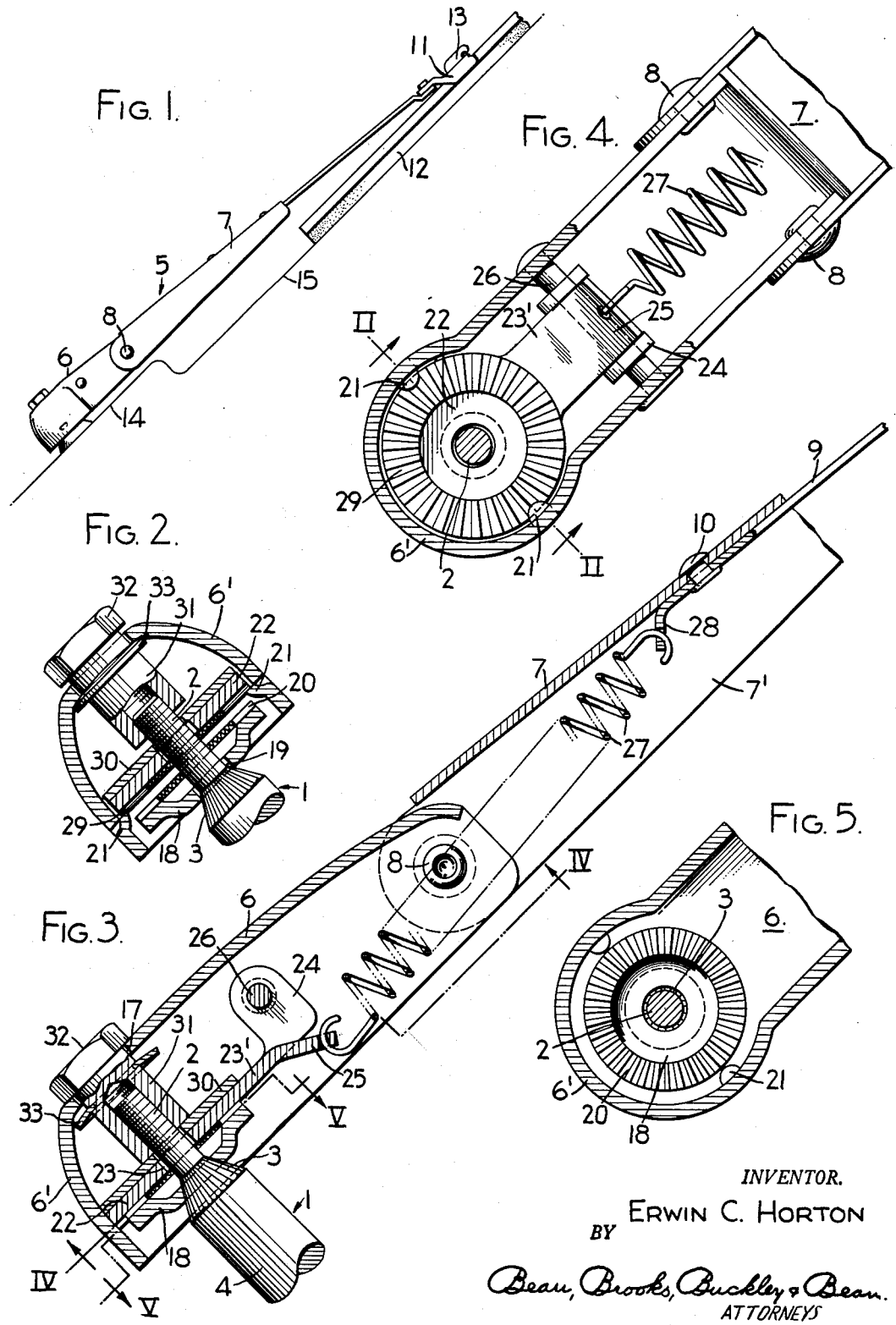
INVENTOR.
ERWIN C. HORTON
BY Bean, Brooks, Buckley & Bean.
ATTORNEYS United States Patent Office 2,738,535
Patented Mar. 20, 1956

2,738,535

WINDSHIELD WIPER ARM

Erwin C. Horton, Hamburg, N. Y., assignor to Trico Products Corporation, Buffalo, N. Y.

Application February 23, 1952, Serial No. 272,937

12 Claims. (Cl. 15—255)

This invention relates to windshield cleaners, and more particularly to windshield cleaners of the type wherein an oscillatable wiper actuating arm is connected to and driven by a shaft oscillated by a suitable motor.

In windshield cleaners of the aforesaid type, means must be provided for rigidly connecting the wiper actuating arm to the shaft, whereby to provide a positive drive for oscillating the arm. However, it is highly desirable, that means also be provided for adjusting the position of the arm on the shaft.

Thus, in the initial installation of the windshield cleaner, the wiper arm must be placed on the shaft in a particular position determined by the desired position of the path of the wiper across the window surface. Naturally, this position of the arm on the shaft will vary in different installations according to different window sizes and constructions, it being desirable not only to provide a wiper path which will clean the most essential viewing area through the window, but also one which prevents contact of the wiper with the molding of the window so as to prevent the irritating and distracting noise which would otherwise be produced. Also, adjustments in the position of the arm on the shaft must sometimes be made during the life of the windshield cleaner. These adjustments are occasioned by the use of replacement wipers or arms of different size, or by reason of the wiper actuating arm having become accidentally forced to a different and undesirable position, and for a multitude of other reasons which from time to time occur. Further, it is desirable that the means for adjusting the position of the arm on the shaft be such as to permit relatively small adjustments to be made, since frequently only a slight adjustment is desired or necessary.

In addition, it is desirable that means be provided for adjusting the position of the arm without disturbing the connection at the shaft. For example, in many prior art installations there is a member carried by or engageable with the arm and adapted to be wedged or otherwise fixedly secured on the shaft. Once this member is fixed to the shaft, it is desirable that it not be disturbed.

In prior art installations having means for adjusting the position of the arm on the shaft, such adjustment usually requires disturbing the connection between the arm and the shaft at the point of connection to the shaft and moving the entire arm assembly about the shaft. As previously pointed out, it is undesirable to disturb the fixed connection to the shaft. Also, with such an arrangement it is difficult if not impossible to make relatively slight adjustments. Thus, with the usual prior art arrangement comprising a knurled or serrated shaft together with an interfitting member carried by the arm, which arm member may also be knurled or serrated, the knurling or serration is usually necessarily relatively large in size and consequently adjustments of the arm position must usually be of a relatively extreme nature.

Accordingly, it is an object of this invention to provide a window cleaner of the type including wiper means movable through a predetermined path across said window, together with means for adjusting the position of said path on said window.

An additional object of this invention is to provide a windshield cleaner of the type comprising an oscillatable wiper actuating arm driven by a shaft, together with means for adjusting the position of said arm on said shaft.

Another object of this invention is to provide a windshield cleaner as aforesaid, having means for adjusting the position of the arm on the shaft without disturbing the fixed connection to the shaft.

A further object of the instant invention is to provide a windshield cleaner of the aforementioned type, wherein means are provided for making relatively slight adjustments in the position of the arm on the shaft.

In addition, it is an object of this invention to provide a windshield cleaner of the aforesaid type having means facilitating repositioning of the arm on the shaft.

It is also an object of the instant invention to provide a windshield cleaner of the aforesaid type and having all of the aforementioned characteristics and attributes, and which is relatively inexpensive to manufacture, simple in construction, and completely reliable in operation.

The aforesaid and other objects will become clearly apparent upon an understanding of the ensuing detailed description taken together with the accompanying drawings wherein like reference numerals identify like parts throughout the several views, and wherein:

Fig. 1 is a view in side elevation of the wiper actuating arm of the instant invention, and showing the same mounted in position on a motor driven shaft for oscillation thereby through a predetermined path across the surface of a window;

Fig. 2 is a transverse sectional view through the mounting section of the wiper actuating arm of Fig. 1, taken along line II—II of Fig. 4;

Fig. 3 is a longitudinal sectional view of the wiper actuating arm and assembly of Fig. 1, with certain parts broken away for greater clarity and ease of illustration;

Fig. 4 is a view partly in section taken along line IV—IV of Fig. 3; and

Fig. 5 is a fragmentary sectional view taken along line V—V of Fig. 3.

There is shown in the drawings a driven oscillatable shaft 1, which shaft may be the drive shaft of a suitable motor operated by suction, electricity, or by any other power. Alternatively, shaft 1 may be a rockshaft driven from such a motor by any conventional drive means. Shaft 1 is provided with a threaded outer end 2 of reduced diameter, and an intermediate knurled, serrated, or otherwise grooved surface or section 3, which section is preferably conical in shape and serves to join outer end 2 to the inner portion 4 which is of greater diameter.

The wiper actuating arm, which is generally designated 5, is seen to comprise an inner mounting section 6 and an outer blade-carrying section 7 pivotally connected thereto as by means of pivot pins 8. Section 6 is provided with a depending skirt portion 6', and section 7 has depending side walls 7' whereby to provide a channel-shaped section. A relatively slender elongate arm member 9 is secured to section 7 by any conventional means, as for example rivets 10, and is provided at its outer end with a blade attaching member 11 of any conventional form. A blade 12, which may be of any conventional form, is detachably secured to member 11 by a blade-carried attaching means 13. Shaft 1 extends through the cowl 14 of the vehicle adjacent windshield 15, and the arrangement is such that blade 12 is oscillated through a predetermined path across the surface of windshield 15.

Along its top wall portion, mounting section 6 is provided with an opening 17, which opening is arranged for alinement with outer end 2 of shaft 1. A thrust receiving collar member 18 of generally circular plate form with an offset central portion having a central opening 19 therethrough is provided, with said opening 19 being adapted to receive the outer end 2 of shaft 1 so that collar 18 will rest against the grooved surface 3 of said shaft, as clearly illustrated in Fig. 2. Collar 18 is provided with serrations or other means forming a grooved surface, as at 20, which grooved surface is annular in form and extends around the top peripheral portion of said collar. Skirt 6' is provided with diametrically opposed staked indents 21 on opposite sides thereof for a purpose to be described, and when arm 5 is completely assembled on shaft 1 said indents are beneath the top peripheral surface of collar 18 with collar 18 being of less diameter than the distance between said indents as illustrated in Figs. 2 and 5.

A key member 22, comprising a circular plate having a central opening 23 therethrough and formed with a radially extending portion 23' having spaced upstanding ears 24 and a depending flange portion 25 is pivotally attached to the opposite sidewalls of skirt 6' by means of a pivot pin 26 extending through the opposite sidewalls of said skirt portion and through said upstanding ears 24, as clearly illustrated in Fig. 4. A spring 27 extends between flange 25 on member 22 and a flange 28 on the inner end of member 9, whereby to bias said member 22 in a counterclockwise direction about pivot 26, as viewed in Fig. 3. At the same time, section 7 and member 9 of arm 5 are biased in a clockwise direction about pivot pins 8, as viewed in Figs. 1 and 3, thereby pressing blade 12 against windshield 15 with a predetermined spring bias, while at the same time permitting said blade to be pivoted away from said windshield for blade replacement purposes and the like.

Key member 22 is formed with an annular grooved under surface 29, said surface being formed by knurling, serrations, or by other means, and surface 29 is arranged to be alined with surface 20 of collar 18. Also, it will be noted from Figs. 2 and 4 that member 22 is of greater diameter than the distance between indents 21, whereby said member 22 is spring biased to rest against said indents. As is apparent from Fig. 3, member 22 is adapted to be fitted over the outer end 2 of shaft 1, with said end 2 extending through opening 23.

A washer member 30 of circular plate form having an opening therethrough is adapted to be fitted over outer end 2 of shaft 1 so as to rest on top of member 22, and an elongate nut member 31 extends through opening 17 of mounting section 6 to threadedly engage the outer end 2 of shaft 1. Nut member 31 is provided with an enlarged head portion 32 of greater diameter than opening 17, and at a point spaced along said nut member from said head portion there is provided a collar member 33 snap fitted or otherwise secured within a groove in member 31, said collar member 33 being of greater diameter than opening 17. Washer member 30 overlies the grooved surfaces 20 and 29 of members 18 and 22, respectively, whereby pressure applied by nut member 31 to washer member 30 is transmitted and evenly applied thereby to said grooved surfaces.

The windshield cleaner of the instant invention is assembled and operates in the following manner. Thrust receiving collar 18 is first fitted over the outer end 2 of shaft 1 and rests against grooved surface 3 of said shaft, as illustrated in Fig. 2. Arm 5 is then fitted on shaft 1, with key member 22 and washer member 30 fitting over the outer end 2 of said shaft. At this time, the free end of member 22 is carried by indents 21, being biased thereagainst by spring 27. Nut member 31 is then threaded onto outer end 2 of shaft 1, and it will be noted that mounting section 6, and consequently arm 5, is carried by collar 33 on nut member 31 when said nut member is in loosened position on shaft 1.

Arm 5 is then selectively positioned relative to shaft 1 to provide the desired position of the predetermined wiping path on window 15. Nut member 31 is then rotated, as by means of an appropriate tool applied to head portion 32, in a direction to tighten said nut member on end 2 of said shaft, and said nut member bears against washer member 30 and causes said washer member and key member 22 to travel along shaft portion 2 until said key member engages collar 18. Upon thus tightening nut member 31, the grooved surfaces 29 and 20 of member 22 and collar 18, respectively, are caused to firmly engage, and collar 18 is pressed firmly onto grooved portion 3 of shaft 1, all as clearly illustrated in Fig. 3. Also, it will be noted that skirt portion 6' of section 6 is curved inwardly and upwardly and the inner wall thereof bears downwardly against members 30 and 22, whereby arm 5 is securely locked in position.

Thus, thrust collar 18 is fixedly secured on grooved portion 3 of shaft 1. Since the grooved surfaces of member 22 and collar 18 are firmly engaged, and since member 22 is fixed to arm 5, a firm driving connection is thereby formed whereby arm 5 is driven by shaft 1 to oscillate blade 12 through a predetermined path across windshield 15.

When it is desired to vary the position of the predetermined path of wiper blade 12 on windshield 15 by adjusting the angular position of arm 5 on shaft 1, it is merely necessary to rotate nut member 31 in a direction to move the same outwardly along portion 2 of shaft 1, thus loosening said nut member. With such outward movement of nut member 31, collar 33 is caused to bear against the inner top wall of mounting section 6, and will move wiper actuating arm 5 outwardly along with nut member 31. At the same time, staked indents 21, which indents are spaced apart sufficiently to clear collar 18, engage the under side of key member 22 to carry the same outwardly thus causing the grooved surfaces 29 and 20 of member 22 and collar 18 to disengage. Once grooved surfaces 20 and 29 are disengaged, arm 5 is free to be moved or rotated around shaft 1, and consequently it can be moved to a new position on shaft 1 thereby adjusting the position of the predetermined wiping path on windshield 15. It will be noted that this adjustment is not only readily effected, but also is made without disturbing the connection between collar 18 and grooved portion 3 of shaft 1. Thus, this connection remains fixed and undisturbed, and there is no unnecessary tearing or chewing of the edge of opening 19 in collar 18.

As soon as arm 5 has been moved to its new position on shaft 1, nut member 31 is again turned in a direction to tighten the same whereupon grooved surfaces 20 and 29 are once again engaged and the driving connection between shaft 1 and arm 5 is again firmly established.

It is readily apparent that this adjustment is readily and easily effected. Also, with the instant invention it is possible to obtain a relatively slight adjustment. Thus, whereas by reason of its size and shape relatively few grooves or serrations can be placed on section 3 of shaft 1, by reason of the size and shape of the grooved portions of collar 18 and member 22, a relatively large number of grooves or serrations can be placed thereon. Also, it is desirable to use relatively large grooves or serrations on section 3 of shaft 1 whereby to obtain a firm connection of collar 18 thereto. In the instant example, 32 grooves or serrations are provided on section 3, while 72 grooves or serrations are provided on collar 18 and member 22. Therefore, whereas if collar 18 were moved relative to shaft 1 in order to effect the adjustment of arm 5, the smallest adjustment would be 11¼ degrees, with the relative movement taking place between collar 18 and key member 22 in accordance with the instant invention, it is possible to obtain an adjustment as slight as 5 degrees while still affording a firm driving connection.

Thus, it is apparent that the instant invention fully accomplishes its aforesaid objects, and provides a windshield cleaner having means facilitating adjustment of the wiper actuating arm relative to its driving shaft. Obviously, various changes can be made in the illustrated embodiment without departing from the inventive concept, and it is intended that the scope of this invention be determined solely by the appended claims.

Having fully disclosed and completely described this invention in a preferred embodiment thereof, together with its mode of operation, what is claimed as new is as follows:

1. A windshield cleaner structure comprising a drive shaft, a wiper actuating arm, and means adjustably mounting said arm on said shaft for movement therewith including a first member connected to said shaft for movement therewith, a second member connected to said arm for driving the same and adapted for engagement with said first member for movement therewith, fastener means threadedly engaging the outer end of said shaft and bearing against said second member for securing said arm on said shaft with said first and second members engaged for movement in unison, whereby said arm is driven by said shaft, and means automatically operable to disengage said first and second members by loosening said fastener means whereby to permit rotation of said arm relative to said shaft.

2. A windshield cleaner structure comprising, a drive shaft, a wiper arm, a driven member carried by said arm, a drive member on said shaft, fastening nut means threadedly engaging the outer end of said shaft for securing said arm on said shaft with said drive and driven members locked together, whereby said arm will be driven by said shaft through said drive and driven members, and means including shoulder defining means carried by said nut means for bearing against said arm to automatically move said arm outwardly along said shaft upon loosening said nut means, and shoulder defining means carried by said arm for bearing against said driven member upon such outward movement of said arm axially of said shaft for unlocking said driven member from said drive member automatically upon loosening said fastening nut means.

3. A windshield cleaner construction including a drive shaft having a roughened portion adjacent one end thereof, a first plate member mounted on said roughened portion, a wiper arm, a second plate member connected to said arm and fitting over said one end of said shaft, said first and second plate members having complementary annular portions provided with interfitting position determining roughened surfaces, fastening means including a nut member threadedly engaging said one end of said shaft and bearing against said second plate member for mounting said wiper arm upon said one end of said shaft with the annular portions of said plate members in frictional engagement whereby said arm is driven by said shaft, said fastening means bearing against said arm for moving the latter axially outwardly along said shaft as said nut member is rotated to loosen the same with respect to said shaft, and shoulder forming means carried by said wiper arm for bearing against said second plate member and automatically disengaging the same from said first plate member without disturbing the mounting thereof on said shaft upon such axial movement of said wiper arm relative to said shaft.

4. In a windshield cleaner, a drive shaft having a grooved portion adjacent one end thereof, a first plate member fixed on said grooved portion and having a grooved annular face portion lying in a plane transverse to the axis of said shaft, a wiper actuating arm, a second plate member connected to said arm and having a corresponding grooved annular face portion, means mounting said arm on said one end of said shaft with said plate members engaging at said grooved face portions, said second plate member extending laterally beyond said first plate member, said arm having a skirt portion extending beyond said first and second plate members to substantially enclose the same, and detent means carried by said skirt portion for disengaging said second plate member from said first plate member without disturbing the latter upon outward movement of said arm relative to said shaft.

5. A windshield cleaner structure comprising, a drive shaft having a grooved surface portion, a first plate member mounted on said grooved portion and having a grooved annular face portion, an articulated wiper arm having an inner mounting section and an outer wiper carrying section pivotally connected thereto, a second plate member pivotally connected to said inner section and having a grooved annular face portion, spring means extending between said outer section and said second plate member for biasing the latter toward said first plate member, means mounting said arm on said shaft with the grooved annular face portions of said plate members in engagement, and means carried by said wiper arm for disengaging said second plate member from said first plate member without disturbing the latter upon partial removal of said arm from said shaft.

6. A windshield cleaner construction comprising, a drive shaft having a threaded outer end and a grooved shoulder portion adjacent thereto, a first plate member mounted on said shoulder portion and having a grooved annular face portion lying in a plane extending transversely of said shaft, a wiper actuating arm, a second plate member drivingly engaging said arm and having a corresponding grooved annular face portion adapted to engage the face portion of said first plate member, locking means extending between said arm and the outer end of said shaft and threadedly engaging said outer end to secure said arm thereon, means including said locking means engaging said second plate member upon tightening of said locking means to cause the grooved face portions of said plate members to engage, and means carried by said arm for disengaging said second plate member from said first plate member when said locking means is loosened and said arm is partially removed from said shaft.

7. A windshield cleaner construction comprising, a drive shaft having a grooved shoulder portion, a first plate member force fitted on said shoulder portion and having a grooved annular face portion, a wiper arm, a second plate member pivotally attached to said arm and having a grooved annular face portion engageable with the face portion of said first plate member, said second plate member extending outwardly beyond said first plate member upon engagement thereof, means releasably fastening said arm on said shaft with the face portion of said second plate member engaging the face portion of said first plate member, a depending skirt portion on said arm fitting over said plate members, and spaced detent means on said skirt portion clearing said first plate member and bearing against said second plate member upon partial removal of said arm from said shaft to disengage said second plate member from said first plate member without disturbing the same.

8. In a vehicle having a window, a window cleaner comprising a wiper actuating arm, a wiper carried by said arm, and drive means including an oscillatable shaft for oscillating said wiper through a predetermined path across the surface of said window, said shaft having a threaded outer end and means defining a grooved shoulder adjacent thereto, a first plate member fitted on said shoulder and having a grooved annular surface thereon, a second plate member attached to said arm for oscillating movement therewith and having a grooved annular surface engageable with the grooved surface of said first plate member, a fastening nut member engaging said arm and threadedly engaging the outer end of said shaft, means including said nut member operatively alined with said plate members to bear against said second plate member and cause the grooved surface of said second plate member to engage the grooved surface of said first plate member as said nut member is tightened, whereby said wiper is oscillated by said shaft through said arm, said nut member being connected to said arm for moving the same axially of said shaft upon loosening and tightening said nut member, and means carried by said arm for automatically disengaging said second plate member from said first plate member as said arm moves axially outwardly along said shaft upon loosening said nut member whereby to permit repositioning of said predetermined wiper path on said window.

9. A vehicle window cleaner comprising a wiper actuating arm, a wiper carried by said arm, drive means including an oscillatable shaft for oscillating said wiper through a predetermined path across the window surface, said shaft having a threaded outer end and means defining a grooved shoulder adjacent thereto, a first plate member fitted on said shoulder and having a grooved annular surface thereon, a second plate member attached to said arm for oscillating movement therewith and having a grooved annular surface engageable with the grooved surface of said first plate member, said second plate member extending laterally beyond said first plate member upon engagement therewith, a fastening nut member engaging said arm and threadedly engaging the outer end of said shaft, means including said nut member operatively aligned with said plate members to bear against said second plate member and cause the grooved surface thereof to engage the grooved surface of said first plate member as said nut member is tightened, whereby said wiper is oscillated by said shaft through said arm, means carried by said nut member for bearing against said arm and moving the same axially outwardly of said shaft upon loosening of said nut member, and means carried by said arm for automatically disengaging said second plate member from said first plate member as said arm moves outwardly along said shaft upon loosening said nut member, whereby to permit repositioning of said predetermined wiper path.

10. A window cleaner comprising a drive shaft having a threaded outer end and a grooved portion adjacent thereto, a first plate member secured on said grooved portion for movement therewith and having a grooved annular face portion lying in a plane extending transversely of said shaft, a wiper actuating arm, a second plate member carried by said arm and adapted to fit over the outer end of said shaft, said second plate member having a grooved annular face portion engageable with the grooved face portion of said first plate member, nut means extending through said arm and threadedly engaging the outer end of said shaft for securing said arm to said shaft, means including said nut means bearing against said second plate member to cause the grooved face portions of said plate members to engage upon tightening of said nut means, means defining a shoulder on said nut means for carrying said arm with said nut means upon loosening thereof whereby said arm will move outwardly along said shaft upon loosening said nut means, and means carried by said arm for automatically disengaging said second plate member from said first plate member upon such outward movement of said arm, whereby said first and second plate members are disengaged for repositioning of said arm about said shaft automatically upon loosening said nut means.

11. In a windshield wiper actuating arm adapted to be mounted on a rotatable drive shaft having a threaded outer end and a tapered serrated shoulder adjacent thereto, a first member adapted to be press-fitted onto the shoulder for movement with the shaft, a second member connected to said arm for driving the same and adapted for engagement with said first member for movement therewith, means including a nut member carried by said arm adapted for engagement with the threaded outer end of the shaft and bearing against said second member for securing said arm on the shaft with said first and second members engaged for movement in unison, whereby said arm will be driven by the shaft, and means actuated by said nut member to automatically disengage said second member from said first member without disturbing the latter upon loosening said nut member whereby to permit rotation of said arm relative to the shaft.

12. In a windshield wiper actuating arm adapted to be mounted on a rotatable drive shaft having a threaded outer end and a tapered serrated shoulder adjacent thereto, an apertured plate member adapted to be press fitted onto the shoulder for movement with the shaft and having an annular serrated portion lying in a plane transverse to the shaft when said first member is fitted on the shaft, a second apertured plate member connected to said arm for driving the same and having a corresponding annular serrated portion adapted for engagement with the serrated portion of said first member in any one of multiple relative positions, means including a nut member carried by said arm adapted for engagement with the threaded outer end of the shaft and bearing against said second member for securing said arm on the shaft with said first and second members engaged for movement in unison, whereby said arm will be driven by the shaft, and means actuated by said nut member to automatically disengage said second member from said first member without disturbing the latter upon loosening said nut member whereby to permit rotation of said arm relative to said shaft.

References Cited in the file of this patent

UNITED STATES PATENTS

| | | |
|---|---|---|
| 1,849,604 | Weatherhead | Mar. 15, 1932 |
| 2,299,280 | Reed | Oct. 20, 1942 |
| 2,417,991 | Nesson | Mar. 25, 1947 |
| 2,442,697 | Krohm | June 1, 1948 |
| 2,684,258 | Krohm | July 20, 1954 |

FOREIGN PATENTS

| | | |
|---|---|---|
| 547,989 | Great Britain | Sept. 21, 1942 |